United States Patent
Melikian

(10) Patent No.: US 9,138,895 B2
(45) Date of Patent: Sep. 22, 2015

(54) METHOD FOR PICKING UP AN ARTICLE USING A ROBOT ARM AND ASSOCIATED SYSTEM

(71) Applicant: Simon Melikian, Westlake, OH (US)

(72) Inventor: Simon Melikian, Westlake, OH (US)

(73) Assignee: RECOGNITION ROBOTICS, INC., Elyria, OH (US)

( * ) Notice: Subject to any disclaimer, the term of this patent is extended or adjusted under 35 U.S.C. 154(b) by 44 days.

(21) Appl. No.: 14/152,512

(22) Filed: Jan. 10, 2014

(65) Prior Publication Data

US 2015/0197009 A1 Jul. 16, 2015

(51) Int. Cl.
| | |
|---|---|
| *B25J 9/16* | (2006.01) |
| *B25J 9/08* | (2006.01) |
| *B25J 19/02* | (2006.01) |
| *B23Q 3/155* | (2006.01) |

(52) U.S. Cl.
CPC ........ *B25J 9/1664* (2013.01); *B25J 9/08* (2013.01); *B25J 19/023* (2013.01); *B23Q 3/15546* (2013.01); *G05B 2219/36362* (2013.01); *G05B 2219/40284* (2013.01); *G05B 2219/50276* (2013.01); *Y10S 901/02* (2013.01); *Y10S 901/47* (2013.01)

(58) Field of Classification Search
CPC ............. A61B 2019/2234; B23Q 3/15546; G05B 2219/32114; G05B 2219/37572; G05B 2219/39393; G05B 2219/40564; G05B 2219/31095; G05B 2219/36362; G05B 2219/50276; G05B 2219/50252; G05B 2219/50242; G05B 2219/40284; G06T 2207/30164; G06T 7/0004; G06T 7/0042; B85J 9/1664; B85J 19/023; B85J 9/08; Y10S 901/02; Y10S 901/47
USPC ....................................... 700/259; 901/30, 41
See application file for complete search history.

(56) References Cited

U.S. PATENT DOCUMENTS

| | | | | |
|---|---|---|---|---|
| 5,542,168 | A | * | 8/1996 | Best ........................... 29/407.04 |
| 5,680,694 | A | * | 10/1997 | Best ............................... 29/701 |
| 6,008,636 | A | * | 12/1999 | Miller et al. .............. 324/757.01 |
| 6,317,953 | B1 | * | 11/2001 | Pryor ......................... 29/407.04 |
| 7,845,560 | B2 | | 12/2010 | Emanuel |
| 8,444,631 | B2 | * | 5/2013 | Yeung et al. ...................... 606/1 |
| 2006/0057239 | A1 | * | 3/2006 | Hariki et al. ............... 425/126.1 |
| 2006/0149421 | A1 | * | 7/2006 | Akiyama et al. .............. 700/245 |
| 2008/0082213 | A1 | * | 4/2008 | Ban et al. ...................... 700/260 |
| 2008/0221721 | A1 | * | 9/2008 | Reed et al. .................... 700/109 |
| 2012/0165986 | A1 | * | 6/2012 | Fuhlbrigge et al. ........... 700/259 |
| 2012/0190981 | A1 | * | 7/2012 | Harris et al. .................. 600/439 |
| 2012/0265344 | A1 | * | 10/2012 | Nakahara ..................... 700/259 |

* cited by examiner

*Primary Examiner* — Jason Holloway
(74) *Attorney, Agent, or Firm* — Rankin, Hill & Clark LLP

(57) ABSTRACT

A method for picking up an article using a robot arm includes capturing images with a camera and processing the captured images to locate a machine-readable symbol affixed to the article. The machine-readable symbol includes an orientation pattern and encoded information pertaining to the article. The orientation pattern provides information to determine x, y, and z coordinates and Rx, Ry and Rz of a gripping tool attached to the robot arm. The encoded information provides information to determine the appropriate gripping tool, gripping location and gripping motion path.

17 Claims, 6 Drawing Sheets

METHOD FOR PICKING UP AN ARTICLE USING A ROBOT ARM AND ASSOCIATED SYSTEM

BACKGROUND

Robots have been used to pick up articles, for example on manufacturing assembly lines. Typically the article is presented to the robot in a particular orientation so that the movement of the robot arm to pick up the article can be confined to a particular motion path. Even when the robot arm is associated with a computer vision system, the article that is to be picked up is still typically presented to the robot in a particular orientation. Many more problems are presented when the robot arm is used to grip an article in unconstrained environment, i.e., in an environment where the article is not presented to the robot in any particular orientation. In such non-constrained environment the robot does not "know" the particular motion path to grip the article, nor does it know any information with regard to the orientation of the article.

SUMMARY

In view of the foregoing, a method for picking up an article using a robot arm is disclosed. The method includes moving the robot arm having a camera mounted thereto in a space around the article. The method further includes capturing images with the camera and processing the captured images with computer software to locate a machine-readable symbol affixed to the article. The machine-readable symbol includes an orientation pattern for determining an orientation of the machine-readable symbol and encoded information pertaining to the article. The method further includes decoding the machine-readable symbol to determine information pertaining to the article and determining an appropriate gripping tool from a plurality of available gripping tools based on the determined information pertaining to the article. The method further includes determining whether the appropriate gripping tool is attached to the robot arm. If it is determined that the appropriate gripping tool is not attached to the robot arm, the method includes removing any gripping tool attached to the robot arm, and attaching the appropriate gripping tool. The method also includes processing at least one captured image that includes the machine-readable symbol to determine x, y, and z coordinates and Rx, Ry and Rz of the appropriate gripping tool attached to the robot arm with respect to the machine-readable symbol. The method further includes determining a gripping location on the article based on the determined information pertaining to the article, determining a gripping motion path in which the robot arm moves to grip the article with the gripping tool based on the determined information pertaining to the article, moving the robot arm along the gripping motion path toward the gripping location, and actuating the gripping tool to grip the article at the gripping location.

DETAILED DESCRIPTION

Figure 1:
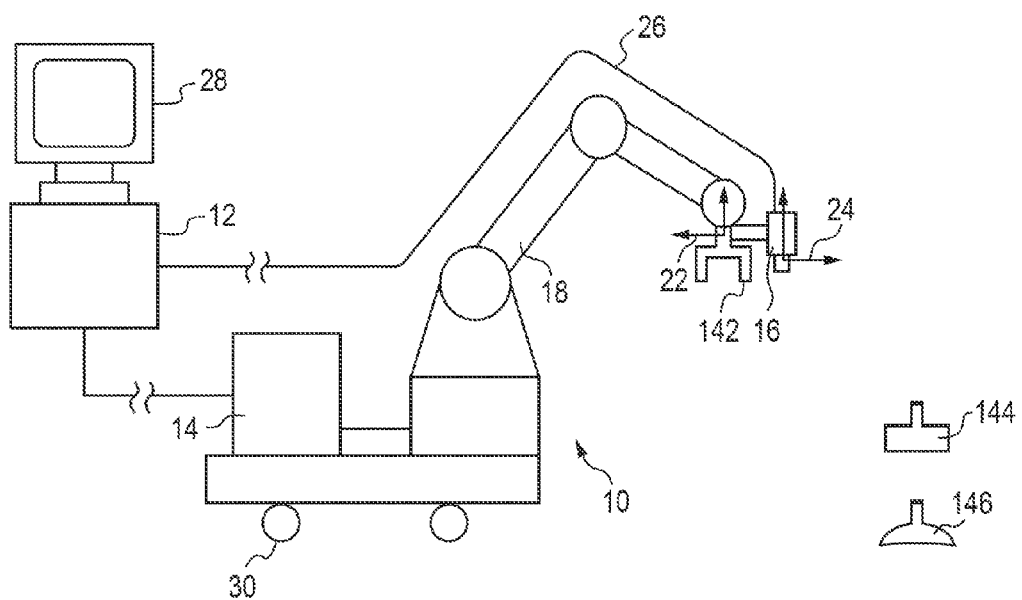
FIG. 1 is a schematic depiction of a robot having a robot arm and an image processing unit in communication with the robot.

FIG. 1 depicts a robot 10 in communication with an image processing unit 12. The robot 10 includes a robot controller 14, which can be conventional, and a camera 16, which can be a conventional CCD camera. The robot 10 includes a robot arm 18 that is moveable in multiple directions and in multiple axes. The camera 16 is mounted to a distal end portion of the robot arm 18. A relative relationship between a coordinate system 22 at the distal end portion of the robot arm 18 and a reference coordinate system 24 for the camera 16 is set. An image captured by the camera 16 is output to the image processing unit 12 via a communication line 26, which can be wireless. The image processing unit 12 also includes a monitor 28 for display of the captured image. The robot 10 can further include wheels 30 (or similar device) so that the robot can travel across a surface.

Figure 2:
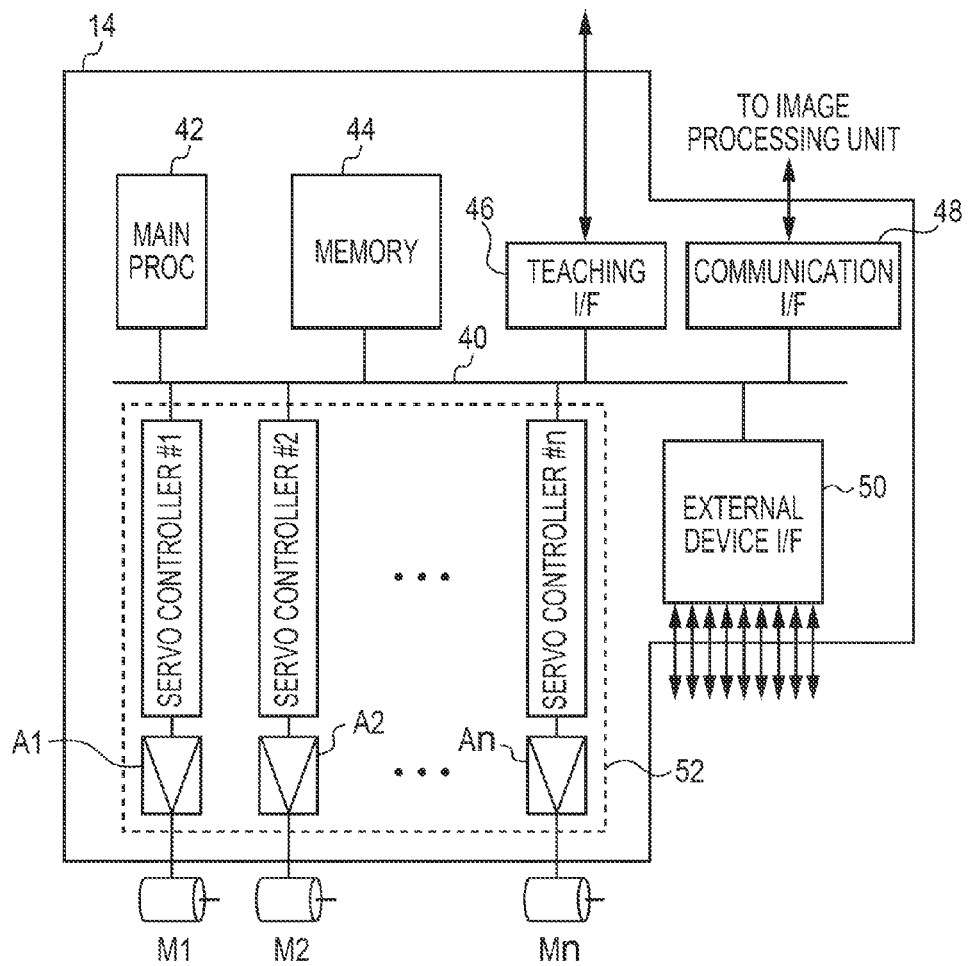
FIG. 2 is a schematic depiction of the components of a robot controller for the robot depicted in FIG. 1.

FIG. 2 schematically depicts the robot controller 14, which can be the same in construction as a conventional robot controller. A bus 40 connects a main processor 42, a memory 44 including RAM, ROM and non-volatile memory, a teaching interface 46, an image processing unit interface 48, an external device interface 50, and a servo control unit 52. A system program for performing basic functions of the robot 10 and robot controller 14 is stored in the ROM of the memory 44. A program for robot operation that varies depending on application is taught beforehand and is stored in the non-volatile memory of the memory 44, together with relevant pre-set data. The program for robot operation that varies depending on application can be taught through the teaching interface 46. The servo control unit 52 includes servo controllers #1 to #n (where n indicates the total number of robot axes). Each of the servo controllers includes a processor and memory arranged to carry out control for a corresponding axis servo motor M1-Mn. Outputs of the servo controllers are delivered through servo amplifiers A1-An to the axis servo motors M1-Mn, which are provided with position/speed detectors for individually detecting the position, speed of the servo motors so that the position/speed of the servo motors is fed back to the servo controllers. External devices such as actuators and sensors of peripheral equipment connect to the robot controller 14 through the external device interface 50.

Figure 3:
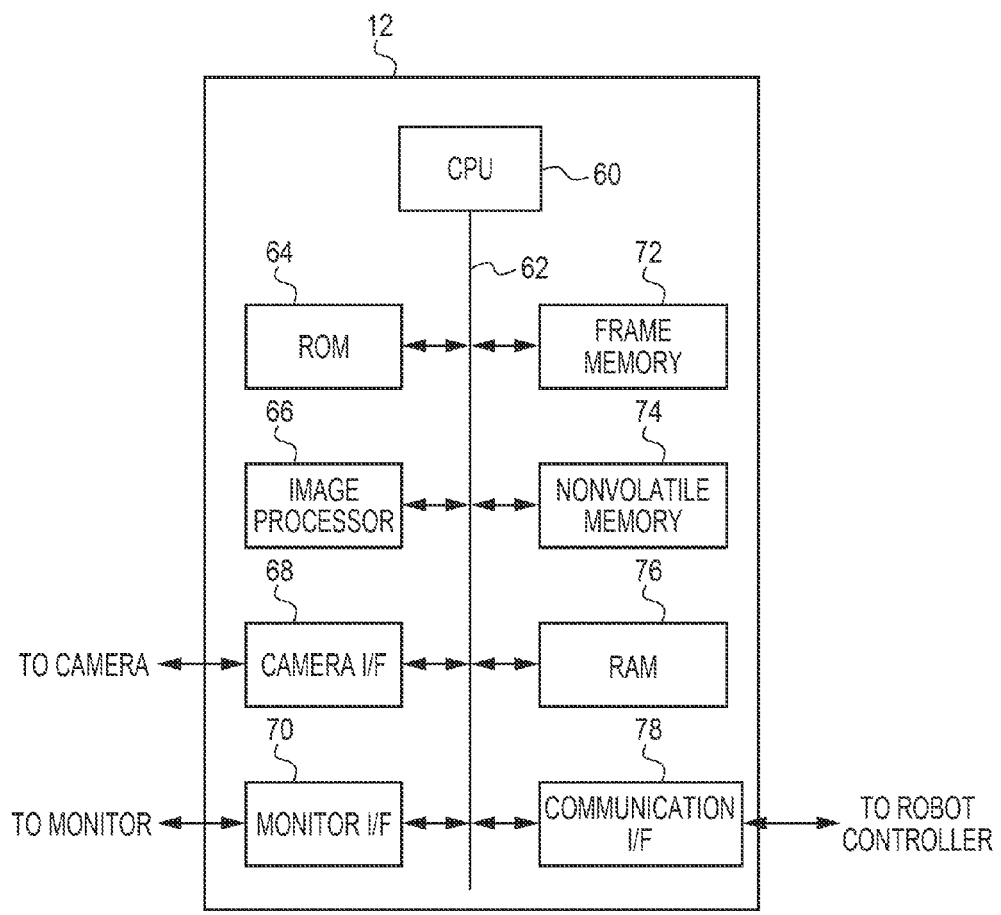
FIG. 3 is a schematic depiction of the components of the image processing unit depicted in FIG. 1.

FIG. 3 schematically depicts the image processing unit 12, which is connected to the robot controller 14 through the image processing unit interface 48 (FIG. 2). A processor 60 connects through a bus 62 to a ROM 64 for storing a system program executed by the processor 60, an image processor 66, a camera interface 68, a monitor interface 70, a frame memory 72, a non-volatile memory 74, a RAM 76 used for temporal data storage, and a robot controller interface 78. The camera interface 68 allows the camera 16 (FIG. 1) to connect with the image processing unit 12. The monitor interface 70 allows the image processing unit 12 to connect with the monitor 28 (FIG. 1). The robot controller interface 78 allows the image processing unit 12 to connect with the robot controller 14.

Figure 4:
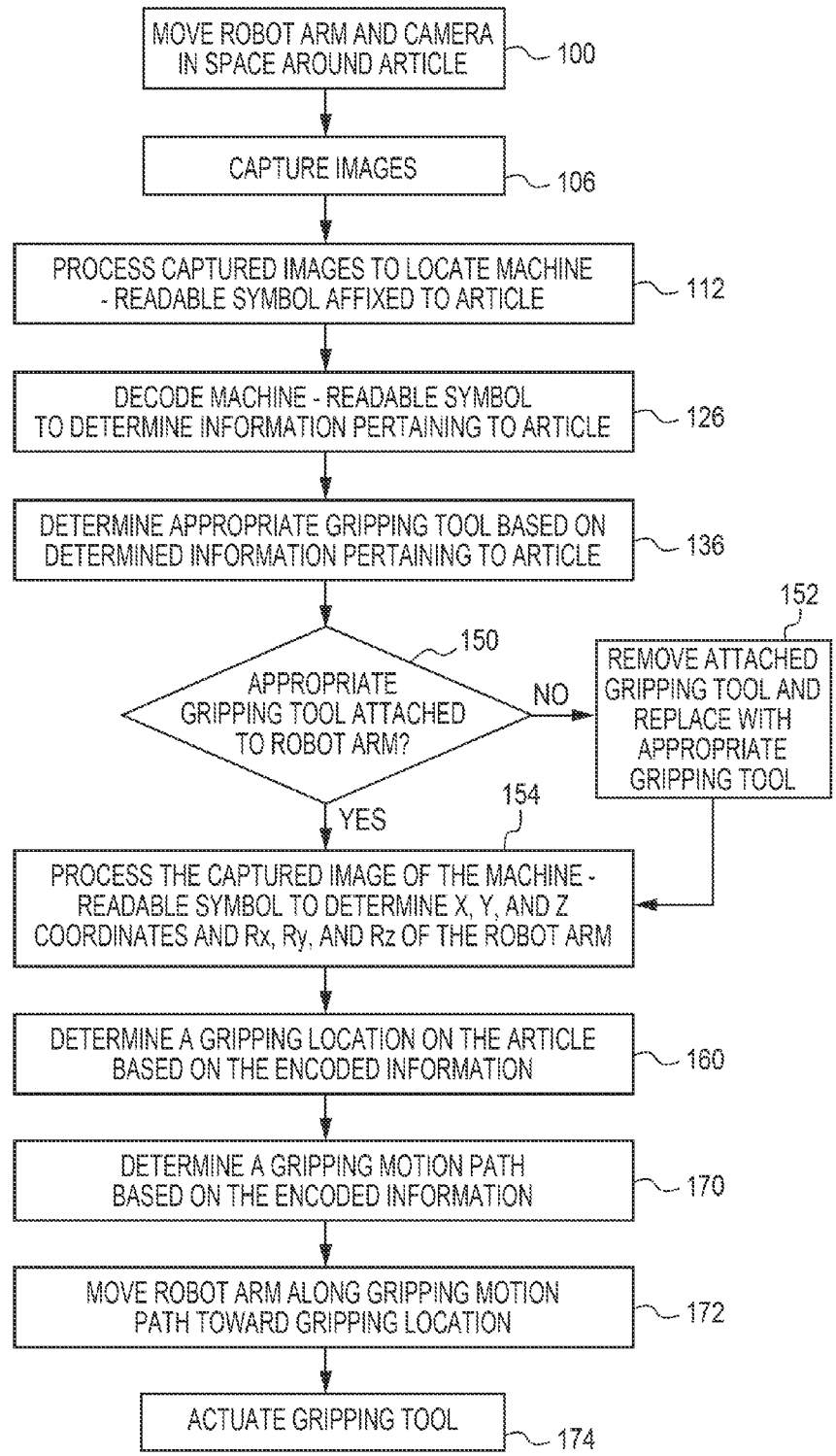
FIG. 4 is a flow diagram depicting a method for picking up an article using the robot arm.

FIG. 4 depicts a method for picking up an article using a robot arm, such as the robot arm 18 depicted in FIG. 1. FIG. 4 depicts the steps of the method for picking up an article in a particle order. It should be understood that the order in which the steps are presented in FIG. 4 and described below could be changed, and that the steps need not be performed in any particular temporal order unless it is particularly described as such. Moreover, some steps may be performed at the same time as others.

Figure 5:
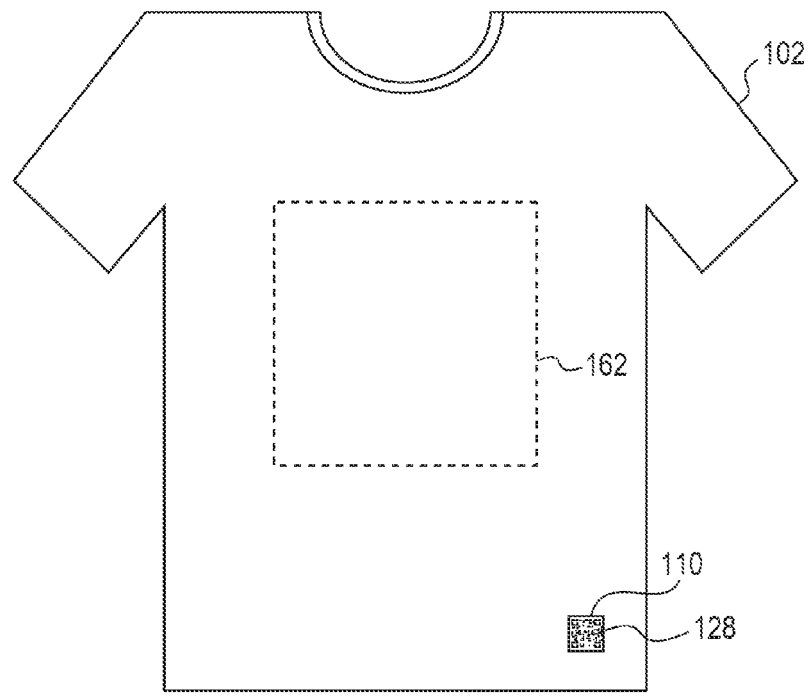
FIGS. 5 and 6 depict articles that are to be picked up by the robot arm.
Figure 6:
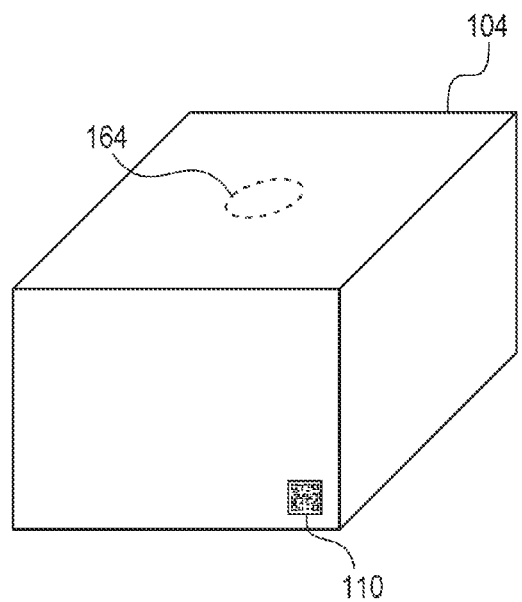

The robot arm 18 (FIG. 1) having the camera 16 (FIG. 1) mounted thereto is moved in a space around an article that is to be picked up (step 100). The article to be picked up can be an article in commerce, e.g., a T-shirt 102 in FIG. 5, or an article that can be used in the manufacture of articles of commerce, such as components of an automobile. The robot 10 can be moved to an area around the article by propelling the wheels 30 using motors (not shown). The control of the movement of the robot 10 to a particular location and driving the wheels 30 can be performed by GPS or other control systems. Examples of articles that can be picked up by the robot include a t-shirt 102, which is shown in FIG. 5, and a box 104, which is shown in FIG. 6. These are just two non-limiting examples of articles that could be picked up using the robot 10.

As the robot arm 18 is moved in a space around the article 102, 104 that is to be picked up, the camera 16 captures images (step 106), which are sent over the communication line 26 to the image processing unit 12. With reference to FIGS. 5 and 6, the articles 102, 104 that are to be picked up by the robot 10 each include a machine-readable symbol 110 affixed to the article. The articles 102, 104 are positioned so that the machine-readable symbol 110 is visible in a possible field of view for the camera 16 as the robot arm 18 moves in the space around the article. However, the orientation of article 102, 104 need not be limited to any particular orientation other than to require that the machine-readable symbol 110 be in the possible field of view for the camera as the robot arm 18 moves in the space around the article.

Figure 7:
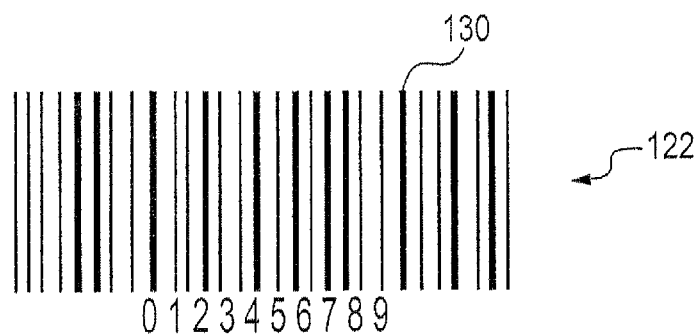
FIGS. 7A and 7B depict steps involved in processing an image of a machine-readable symbol to teach the machine-readable symbol to the robot depicted in FIG. 1.
Figure 7:
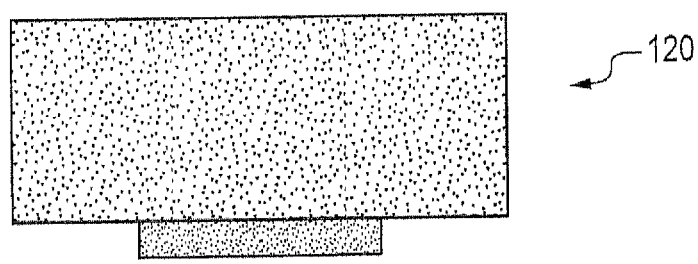

The captured images from the camera 16 are processed in the image processor 66 (FIG. 3), which includes computer software, to locate the machine-readable symbol 110 affixed to the article 102, 104 (step 112). For the articles illustrated in FIGS. 5 and 6, the machine-readable symbol is a 2D (or matrix) bar code, which is known as a QR code. Other machine-readable symbols such as 1D bar codes, which is shown in FIG. 7a, can also be used as the machine-readable symbol. Whether the machine-readable symbol is a 1D bar code or a 2D bar code or another type of machine-readable symbol, the machine-readable symbol is an optical machine-readable representation of data or information relating to the article to which it is attached and includes an orientation pattern for determining an orientation of the machine-readable symbol and encoded information pertaining to the article to which the machine-readable symbol affixed. The machine-readable symbol is decoded by the image processing unit 12 in a manner that will be described in more detail below.

Processing the captured images with computer software to locate the machine-readable symbol 110 affixed to the article 102, 104 can be performed by comparing a learned image 120, an example of which is shown in FIG. 7b, to a target image, which is located in the captured images that were captured by the camera 16 in step 106. The learned image 120 depicted in FIG. 7b represents a machine-readable symbol such as a UPC code 122 that is shown in FIG. 7A. The learned image 120 has a perimeter the same in size and shape as the UPC code 122. The learned image 120 is an image of the UPC code that is eroded or dilated to merge indicia, such as the bars making up the UPC code, which results in the learned image 120 being a structure having an outline or perimeter that is the same as the UPC code. A similar type of process could be performed on a QR code where the learned image would be an image of the QR code that is eroded or dilated to merge indicia making up the QR code, such as the cells in the QR code, such that the learned image is a structure having an outline or perimeter that is the same as the QR code, i.e., a one inch square. The learned image 120 is then taught to the image processor 66 in the image processing unit 12.

The images that are captured by the camera (step 106) are continued to be processed until there is a match between a target image in one of the images that was captured by the camera 16 and a learned image, such as the learned image 120 in FIG. 7b. Since the machine-readable symbols can each be unique, the image processor 66 does not learn each unique machine-readable symbol, e.g., the image processor does not learn each unique QR code or each unique UPC code that is to be affixed on an article to be picked up. Instead, the image processor 66 is programmed to recognize images that are more general than the specific machine-readable symbol 110 that is affixed to the article 102, 104 that is to be picked up. As such, the learned image 120 that is eroded or dilated is taught to the image processing unit 12. A match between the target image and the learned image can be determined using systems described in U.S. Pat. Nos. 7,831,098 and 8,150,165, which are commonly owned.

Processing the captured images with computer software to locate the machine-readable symbol 110 affixed to the article 102, 104 can also be performed in other manners. The machine-readable symbol 110 depicted in FIGS. 5 and 6 is surrounded by an optical quiet zone 128. The UPC code 122 depicted in FIG. 7a is also surrounded by an optical quiet zone 130. The image processor 66 can include computer software to locate the machine-readable symbol affixed to the article by comparing a learned image, which represents the optical quiet zone of the machine-readable symbol, to a respective target image, which is located in the captured images from step 106, to identify a match between the learned image and the target image. The optical quiet zone surrounding QR codes, for example, is the same for each QR code no matter the encoded information within the QR code. The same holds true for a UPC code. As such, the quiet zone of each of these codes could be taught to the image processing unit 12 and the image processor 66 can be programmed to recognize the appropriate optical quiet zone. A match between the target image and the learned image can be determined using systems described in U.S. Pat. Nos. 7,831,098 and 8,150,165.

After the machine-readable symbol 110 has been located on the article 102, 104, the image processor 66 (FIG. 3) decodes the machine-readable symbol to determine information pertaining to the article (step 126). The image processor 66 can be programmed with the appropriate known 1D and 2D barcode decoding software. The information that is encoded in the machine-readable symbol can include information as to the appropriate gripping tool that should be used to grip the article. The encoded information on the machine-readable symbol could also include the gripping location on the article, the gripping motion path in which the robot arm 18 moves to grip the article with the gripping tool, and the pressure applied by the gripping tool on the article. The encoded information in the machine-readable symbol could also include the weight of the article, the size of the article, and the material type of the article as well as other information commonly found in QR codes and UPC codes. Again, QR codes and UPC bar codes are only two examples of machine-readable symbols that could be employed. It is quite likely that another type of optically machine-readable symbol that can encode the information shown above (or direct the image processing unit to appropriate database to locate the information) would be employed. Other known matrix-type machine readable codes that are in use in commerce, such as matrix codes similar to those used by United Parcel Service (UPS), could also be used.

The main processor 42 on the robot controller 14 or the processor 60 on the image processing unit 12 determines the appropriate gripping tool based on the determined information pertaining to the article that was decoded from the machine-readable symbol in step 126 (step 136). A plurality of gripping tools 142, 144, 146 can attach to the distal end portion of the robot arm 18. FIG. 1 depicts a gripper 142, a magnet 144, and a suction cup 146 as the gripping tools. Other gripping tools could also be used. The appropriate gripping tool to be used to pick up the article is based on the information determined in step 126. In step 126, the image processing unit 12 can access or include a database that stores article weight information, article size information and article material type information for each of the articles that are to be picked up. This information pertaining to the article is encoded in the machine-readable symbol. For example, the machine-readable symbol 110 affixed to the T-shirt 102 in FIG. 5 might include information to indicate that the T-shirt weighs about 1 pound, that the T-shirt is generally rectangular having a height of 2 feet and a width of 1½ feet, and that T-shirt is made from cotton. Based on this information, the appropriate gripping tool can be chosen. An algorithm can be programmed into the main processor 42 of the robot controller 14 or the processor 60 of the image processing unit 12 that associates the characteristics of the article to be picked up, i.e. weight, size and material type information, to the appropriate gripping tool. For example, a lightweight article such as a T-shirt made of a flexible material could be gripped with the gripper 142. Alternatively, if the material type was a magnetic material, then the magnet 144 would be the appropriate gripping tool. If the weight of the object and the material type allowed for it, then the section cup 146 could be the appropriate gripping tool.

The determination of the appropriate gripping tool can be based on at least one of the determined article weight information, the determined article size information and the determined article material type and information from step 126. For example, if the material type information indicates that the material of the article to be picked up is made of glass, then the appropriate gripping tool can be assigned as the suction cup 146. The step of determining the appropriate gripping tool can also be based on each of the determined article weight information, the determined article size information and the determined article material type information. In other words, the weight, the size, and the material type may all be taken into account when determining the appropriate gripping tool. Also, the encoded information within the machine-readable symbol can also provide the robot controller 14 the appropriate gripping tool. In other words, part of the information that is encoded within the machine-readable symbol could indicate that the particular article is to be picked up, for example, by the gripper 142.

Each of the gripping tools 142, 144, 146 that attach to the robot arm 18 can include some sort of sensing and identification device (not shown). This device communicates with the main processor 42 of the robot controller 14 through the external device interface 50 (FIG. 2) to indicate the type of tool attached to the robot arm 18. The robot controller 14 can then determine whether the appropriate gripping tool is attached to the robot arm 18 to grip the particular article (step 150). If at step 150 it is determined that the appropriate gripping tool is not attached to the robot arm 18, then the inappropriate gripping tool is removed and the appropriate gripping tool is then attached with the robot arm (step 152).

The machine-readable symbol does not only provide information to the robot controller 14 to allow the robot controller to determine the appropriate gripping tool, gripping motion, and gripping location of the article. The machine-readable symbol also aids in aligning the robot arm 18 with respect to the article that is to be picked up. The image processor 66 processes the captured image of the machine-readable symbol, which can be the same image that was read by the QR code reader or barcode reader at step 126, to determine x, y and z coordinates and Rx, Ry, and Rz of the appropriate gripping tool attached to the robot arm 18. As mentioned above, the coordinate system 22 at the distal end portion of the robot arm 18 and the reference coordinate system 24 for the camera 16 is set. The image processor 66 can use a learned image, such as the learned image 120 depicted in FIG. 7b, to determine the reference frame for the robot arm 18 with respect to the article that is to be picked up. The image processor 66 can be programmed to determine an amount of translation, rotation, and scaling needed to transform a learned image, which is the same in size and shape as the machine-readable symbol, such that the learned image overlaps the image of the machine-readable symbol and the image that was captured by the camera 16. Such a recognition program is more fully described in U.S. Pat. No. 8,150,165. With the robot arm 18 appropriately aligned with the article to be picked up, the problem with orienting the article with respect to the robot arm is now overcome.

Determining the x, y, and z coordinates and Rx, Ry, and Rz of the robot arm 18 can also be performed by comparing the quiet zone of the machine-readable image and the target image as compared to learned quiet zones of machine-readable images similar to that shown in the target image. In other words, a quiet zone for a QR code could be taught to the image processing unit 12 in a manner more fully described in U.S. Pat. No. 8,150,165 and for an article to be picked up that includes the QR code, the quiet zone from the learned image could be compared to the quiet zone and the target image to determine x, y, and z coordinates and Rx, Ry and Rz of the robot arm. Moreover, indicia within the machine-readable symbol itself could be used to align the robot arm with respect to the article. For example, matrix codes used by UPS include indicia to determine the orientation of the machine-readable symbol. The image processor 66 can be programmed to determine an amount of translation, rotation, and scaling needed to transform the captured image that includes the machine-readable symbol to align the robot arm.

The main processor 42 on the robot controller 14 or the processor 60 in the image processing unit 12 can be used to determine a gripping location on the article 102, 104 based on information encoded in the machine-readable symbol 110 (step 160). For example, the T-shirt 102 depicted in FIG. 5 shows a gripping location as a square region 162 on the T-shirt 102. The box 104 depicted in FIG. 6 depicts a circular region 164 as the gripping location. The location of the machine-readable symbol 110 with respect to the gripping location 162, 164 can be set. The x, y and z offset of the center (or other location) of the machine-readable symbol 110 and the center (or other location) of the gripping location 162, 164 can be set and encoded in the machine-readable symbol. In such a situation the machine-readable symbol would be affixed in the same location when it is attached to similar articles, e.g., the machine-readable symbol would be attached within a region on the lower right front corner of each similar T-shirt 102. As such, when the robot arm is properly aligned with the machine-readable symbol 110, the robot controller 14 can then move the robot arm 18 to the appropriate gripping location based on information decoded from the machine-readable symbol. With the machine-readable symbol 110 affixed to the article 102, 104 at a specified location with respect to the gripping location and the encoded information in the machine-readable symbol 110 including information for determining the gripping location, the robot arm can be moved to the appropriate place to grip the article.

The main processor 42 on the robot controller 14 or the processor 60 on the image processing unit 12 can also determine a gripping motion path for the robot arm 18 (step 170). As discussed above, article weight information, article size information and article material type information can be encoded in the machine-readable symbol 110. Just as this information can be used to determine the appropriate gripping tool 142, 144, 146, this information can also be used to determine the gripping motion path in which the robot arm 18 moves to grip the article 102, 104 with the gripping tool. The motion used by the robot arm 18 to pick up the T-shirt 102 in FIG. 5 would differ from the motion that the robot arm would take to pick up the box 104 depicted in FIG. 6. Algorithms can be programmed into the main processor 42 on the robot controller 14 so that the robot arm 18 chooses the appropriate motion path to pick up the desired article. The robot arm 18 is then moved along the gripping motion path that was determined in step 170 (step 172). The gripping tool is then actuated (step 174). As such, the article is gripped and can be picked up by the robot arm 18.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for picking up an article using a robot arm, the method comprising:
    moving the robot arm having a camera mounted thereto in a space around the article;
    capturing images with the camera;
    processing the captured images with computer software to locate a machine-readable symbol affixed to the article, wherein the machine-readable symbol includes an orientation pattern for determining an orientation of the machine-readable symbol and encoded information pertaining to the article;
    decoding the machine-readable symbol to determine information pertaining to the article;
    determining an appropriate gripping tool from a plurality of available gripping tools based on the determined information pertaining to the article;
    determining with computer software whether the appropriate gripping tool is attached to the robot arm;
    if it is determined that the appropriate gripping tool is not attached to the robot arm, then removing any gripping tool attached to the robot arm, and attaching the appropriate gripping tool;
    processing the at least one captured image that includes the machine-readable symbol to determine x, y, and z coordinates and Rx, Ry, and Rz of the appropriate gripping tool attached to the robot arm with respect to the machine-readable symbol;
    determining a gripping location on the article based on the determined information pertaining to the article;
    determining a gripping motion path in which the robot arm moves to grip the article with the gripping tool based on the determined information pertaining to the article;
    moving the robot arm along the gripping motion path toward the gripping location; and
    actuating the gripping tool to grip the article at the gripping location.

2. The method of claim 1, wherein the step of capturing images with the camera is performed using a non-structured light source.

3. The method of claim 1, wherein the step of processing the captured images with computer software to locate a machine-readable symbol affixed to the article includes comparing a learned image, which represents the machine-readable symbol, to a respective target image, which is located in the captured images, to identify a match between the learned image and the target image.

4. The method of claim 3, wherein the learned image has a perimeter the same in size and shape as the machine-readable code.

5. The method of claim 3, wherein the machine-readable symbol is a 1D or a 2D barcode.

6. The method of claim 5, wherein the learned image is an image of the machine-readable symbol that is eroded or dilated to merge indicia making up the machine-readable symbol such that the learned image is a structure having an outline or perimeter that is the same as the machine-readable symbol.

7. The method of claim 1, wherein the machine-readable symbol is a 1D or a 2D barcode and the orientation pattern is an optical quiet zone surrounding the 1D or the 2D barcode, wherein the step of processing the captured images with computer software to locate a machine-readable symbol affixed to the article includes comparing a learned image, which represents the optical quiet zone of the machine-readable symbol, to a respective target image, which is located in the captured images, to identify a match between the learned image and the target image.

8. The method of claim 1, wherein the step of decoding the encoded information in the machine-readable symbol includes accessing a database to determine article weight information, article size information and article material type information.

9. The method of claim 8, wherein the step of determining the appropriate gripping tool includes determining the appropriate gripping tool based on at least one of the determined article weight information, the determined article size information and the determined article material type information.

10. The method of claim 8, wherein the step of determining the appropriate gripping tool includes determining the appropriate gripping tool based on each of the determined article weight information, the determined article size information and the determined article material type information.

11. The method of claim 8, wherein the step of determining a gripping location on the article further includes determining the gripping location based on the determined article size information and knowing a location of the machine-readable symbol on the article.

12. The method of claim 1, wherein the machine-readable code includes a gripping tool code associated with the appropriate gripping tool for gripping the article.

13. The method of claim 1, wherein the machine-readable code includes a gripping location code associated with the gripping location for the article.

14. The method of claim 1, wherein the machine-readable symbol is affixed to the article at a specified location and the encoded information in the machine-readable symbol includes information for determining the gripping location based on the encoded information and the specified location.

15. The method of claim 1, wherein the step of processing the at least one captured image that includes the machine-readable symbol to determine x, y, and z coordinates and Rx, Ry, and Rz of the appropriate gripping tool further includes determining an amount of translation, rotation and scaling needed to transform a learned image, which is the same in size and shape as the machine-readable symbol, such that the learned image overlaps the machine-readable symbol in the at least one captured image that includes the machine-readable symbol.

16. The method of claim 15, wherein the machine-readable symbol is a 1D or a 2D barcode.

17. The method of claim 16, wherein the learned image is an image of the machine-readable symbol that is eroded or dilated to merge indicia making up the machine-readable symbol such that the learned image is a structure having an outline or perimeter that is the same as the machine-readable symbol.

* * * * *